US010392960B2

(12) United States Patent
Hunter et al.

(10) Patent No.: US 10,392,960 B2
(45) Date of Patent: Aug. 27, 2019

(54) INTEGRALLY FORMED TUBULAR TURBINE COMPRISING FRUSTOCONICALLY-FACED ANNULAR FLOW PATHWAY

(71) Applicant: Tendeka AS, Stavanger (NO)

(72) Inventors: John Hunter, Aberdeen (GB); Ian David McWhinnie, Aberdeen (GB); Sally Tamsin Wood, Westhill (GB)

(73) Assignee: Tendeka AS, Stavanger (NO)

( * ) Notice: Subject to any disclaimer, the term of this patent is extended or adjusted under 35 U.S.C. 154(b) by 0 days.

(21) Appl. No.: 15/507,804

(22) PCT Filed: Oct. 6, 2015

(86) PCT No.: PCT/EP2015/073014
§ 371 (c)(1),
(2) Date: Mar. 1, 2017

(87) PCT Pub. No.: WO2016/055451
PCT Pub. Date: Apr. 14, 2016

(65) Prior Publication Data
US 2017/0284219 A1    Oct. 5, 2017

(30) Foreign Application Priority Data
Oct. 7, 2014    (GB) .................................. 1417734.9

(51) Int. Cl.
*F01D 5/03*    (2006.01)
*H02K 7/18*    (2006.01)
(Continued)

(52) U.S. Cl.
CPC ........ *F01D 17/146* (2013.01); *E21B 41/0085* (2013.01); *F01D 5/02* (2013.01); *H02K 7/1823* (2013.01); *H02P 9/48* (2013.01)

(58) Field of Classification Search
None
See application file for complete search history.

(56) References Cited

U.S. PATENT DOCUMENTS

| 4,176,283 A * | 11/1979 | McLaren | .................. F03B 3/04 |
|  |  |  | 290/52 |
| 8,421,287 B2 * | 4/2013 | Hall | ...................... E21B 21/103 |
|  |  |  | 310/164 |

(Continued)

FOREIGN PATENT DOCUMENTS

| GB | 2461286 A | 12/2009 |
| GB | 2479367 A | 10/2011 |

(Continued)

OTHER PUBLICATIONS

International Search Report PCT/ISA/210 for International Application No. PCT/EP2015/073014 dated Feb. 2, 2016.

(Continued)

*Primary Examiner* — Tulsidas C Patel
*Assistant Examiner* — S. Mikailoff
(74) *Attorney, Agent, or Firm* — Harness, Dickey & Pierce, P.L.C.

(57) ABSTRACT

A turbine for use in extracting energy from fluid flowing along a fluid channel defines a portion of the fluid channel and includes a flow pathway in communication with the fluid channel. A moveable element, such as a rotor, is disposed around the fluid channel and is moveable under the action of fluid flowing along the flow pathway so as to extract energy therefrom. The turbine may be associated with other apparatus in the fluid system, and may be capable of storing extracted energy for later use.

20 Claims, 6 Drawing Sheets

(51) Int. Cl.
*F01D 17/14* (2006.01)
*E21B 41/00* (2006.01)
*F01D 5/02* (2006.01)
*H02P 9/48* (2006.01)

(56) References Cited

U.S. PATENT DOCUMENTS

| | | | | |
|---|---|---|---|---|
| 8,466,595 | B2 * | 6/2013 | Spooner | F03B 13/083 |
| | | | | 310/216.002 |
| 8,872,371 | B2 * | 10/2014 | Ives | F03B 13/264 |
| | | | | 290/42 |
| 9,057,353 | B2 * | 6/2015 | Aubuchon, Sr. | F03B 13/10 |
| 9,464,619 | B2 * | 10/2016 | Allouche | F01D 5/03 |
| 9,759,394 | B2 * | 9/2017 | Aubuchon | F03B 13/10 |
| 2010/0026002 | A1 * | 2/2010 | Spooner | F03B 13/083 |
| | | | | 290/54 |
| 2011/0259639 | A1 * | 10/2011 | Hall | E21B 21/103 |
| | | | | 175/40 |
| 2012/0091732 | A1 * | 4/2012 | Fallet | E21B 41/0085 |
| | | | | 290/40 R |
| 2012/0175877 | A1 * | 7/2012 | Ives | F03B 13/264 |
| | | | | 290/42 |
| 2012/0319409 | A1 | 12/2012 | Schoonover | |
| 2013/0062881 | A1 * | 3/2013 | Mellah | H02K 7/1823 |
| | | | | 290/50 |
| 2013/0230380 | A1 * | 9/2013 | Allouche | F01D 5/03 |
| | | | | 415/1 |
| 2014/0265336 | A1 * | 9/2014 | Aubuchon, Sr. | F03B 13/10 |
| | | | | 290/52 |
| 2015/0076825 | A1 * | 3/2015 | Wyatt, II | H02K 7/1823 |
| | | | | 290/52 |
| 2015/0267884 | A1 * | 9/2015 | Aubuchon | F03B 13/10 |
| | | | | 362/192 |
| 2015/0345260 | A1 * | 12/2015 | Green | E21B 41/0085 |
| | | | | 310/68 R |
| 2017/0306725 | A1 * | 10/2017 | Hunter | E21B 41/0085 |

FOREIGN PATENT DOCUMENTS

| | | |
|---|---|---|
| GB | 2509931 A | 7/2014 |
| WO | WO-97/01018 A2 | 1/1997 |
| WO | WO-2008/081187 A2 | 7/2008 |

OTHER PUBLICATIONS

Written Opinion of the International Searching Authority PCT/ISA/237 for International Application No. PCT/EP2015/073014 dated Feb. 2, 2016.

Search Report for corresponding GB Application No. 1417734.9 dated Apr. 8, 2015.

* cited by examiner

INTEGRALLY FORMED TUBULAR TURBINE COMPRISING FRUSTOCONICALLY-FACED ANNULAR FLOW PATHWAY

CROSS-REFERENCE TO RELATED APPLICATIONS

This application is the U.S. National Phase application of PCT Application No. PCT/EP2015/073014 filed on Oct. 6, 2015, which claims priority to Great Britain Application No. 1417734.9 filed on Oct. 7, 2014 the entire contents of each of which are incorporated herein by reference.

FIELD

The present invention relates to a turbine for use in extracting energy from flow, particularly flow within a conduit, such as a conduit associated with a wellbore.

BACKGROUND

Systems associated with fluid flow systems, and their monitoring and control, may require a power source. For example, in the oil and gas industry, throughout the lifetime of a well, it may be required to supply power to apparatus in or associated with the well. Such powered systems can include, for example, actuation systems requiring mechanical operation such as flow control devices, chokes, valves, etc., sensors such as pressure sensors, communications systems, diagnostic systems, and the like.

It may be convenient for apparatus to be powered by a local power source, such as a battery or generator forming part of apparatus introduced into a well or other fluid conduit. However, in some instances it may be impractical or impossible to supply power in this way.

In the oil and gas industry, placing of downhole components may conflict with future access requirements. For example, it may not be possible for power transmission cables to bypass packers. Apparatus may also become isolated, for example in an old branch of a multilateral well, or where topside installations are removed or abandoned.

The local environment within a fluid flow system (e.g. high temperatures) may also mitigate against the use of apparatus with local power sources such as batteries. For example, temperature of 100-150° C. or more, as routinely encountered in a well, may significantly reduce the lifetime of an electrical battery or indeed prevent its use entirely; particularly where power may be required intermittently over the course of months or years.

To address these shortcomings, it is known to generate power from fluid flowing past a turbine within a conduit, for example as described in the applicant's co-pending UK patent application no. GB 2509931.

SUMMARY

An aspect or embodiment relates to a turbine for extracting energy from fluid flowing along a fluid channel, the turbine defining a portion of the fluid channel, and comprising;
 a flow pathway in communication with the fluid channel; and
 a moveable element disposed around the fluid channel, in the flow pathway;
 the moveable element moveable under the action of fluid flowing along the flow pathway so as to extract energy therefrom.

The turbine may provide for the generation or extraction of energy from fluid flowing along a fluid channel by the turbine. Fluid is permitted to flow through the portion of the fluid channel defined by the turbine, around which the moveable element is disposed, and so the turbine may allow a relatively unimpeded fluid flow along the fluid channel, and may enable apparatus (such as tools, tubular, wireline, etc.) to pass through the turbine along the fluid channel, in use.

The turbine may be configured to convert energy derived from fluid flowing along the flow pathway (kinetic energy) into electrical energy or into another form of energy.

Energy extracted by the turbine may be used concurrently to power apparatus coupled to the turbine. For example, the turbine may be coupled via a mechanical, pneumatic, hydraulic or electrical coupling, to apparatus such as an inflow control device, and the apparatus may be powered directly by energy collected by the turbine. The turbine may be used to power apparatus within the fluid flow system, such as downhole apparatus such as intervention tools, logging apparatus and the like. The turbine may be used to power apparatus associated with the fluid flow system, such as pipeline condition monitoring equipment. For example, the turbine may be used in place of conventional energy supplies, such as solar cells and the like.

Alternatively, or in addition, energy extracted by the turbine may be stored for later use. For example, the turbine may be coupled to an energy storage arrangement. The energy storage arrangement may in turn be capable of powering the apparatus.

The turbine may be configured to simultaneously charge the energy storage arrangement and power apparatus coupled thereto. The energy storage arrangement may be configured to simultaneously receive extracted energy and to power apparatus coupled thereto.

The flow pathway may form part of the fluid channel. Accordingly, the turbine may comprise a moveable element disposed around the fluid channel and defining a portion of the fluid channel. The moveable element may be moveable under the action of fluid flowing along the flow fluid channel so as to extract energy therefrom.

The flow pathway may be separated from the fluid channel, along at least a part of its length.

The flow pathway may be disposed around the fluid channel.

The portion of the fluid channel defined by the turbine may be co-axial with the flow pathway and/or with adjacent portions of the fluid channel. The flow pathway may be co-axial with adjacent portion of the fluid channel. The fluid channel and/or the portion defined by the turbine may be cylindrical or tubular.

The portion of the fluid channel defined by the turbine may have a smaller flow area than the adjacent portions, or may have substantially the same flow area. As mentioned below, the turbine may be at least partly recessed in a thickened wall portion, for example of a tubular, so as to enable the flow area reduction to be minimized. This may, for example, provide for a flow area through the turbine of a size capable allowing intervention tools and the like to pass through the turbine.

The flow pathway may extend within an annulus around the fluid channel. The flow pathway may be annular, along at least a part of its length.

The flow pathway may comprise one or more inlets in communication with, or configured to be placed in communication with, the fluid channel.

The flow pathway may comprise one or more outlets. The one or more outlets may be in communication with, or configured to be placed in communication with, the fluid channel. Alternatively, fluid may be vented or discharged through the/each outlet.

The number of inlets and outlets may the same, or may be different. The turbine may comprise a greater number of inlets than outlets. For example, more than one inlet of a flow pathway may extend to corresponding passages upstream of the moveable element, which converge to a single passage downstream of the moveable element.

The/each inlet may be axially spaced apart along the fluid channel from the/each outlet. For example, an inlet may be upstream of a corresponding outlet, in relation to the direction of flow along the fluid channel (accepting that, in some embodiments, the direction of fluid flow along the fluid channel may vary).

The each inlet may be positioned to one side of the turbine (or the said portion of the fluid channel) and the/each outlet may be positioned to the other side of the turbine (or the said portion of the fluid channel).

The inlets and/or the outlets may be spaced apart (e.g. evenly spaced apart) around the periphery of the fluid channel.

Along all or a part of its length, the flow pathway may be generally aligned with an axis along the fluid channel. That is to say, the direction of flow of fluid along the flow pathway may be generally aligned with the direction of flow of fluid along the fluid channel along all or a part of the length of the flow pathway.

One or more portions of the flow pathway may be curved or convoluted, and so the direction of fluid flow may change along the length of the flow pathway. One or more portions of the flow pathway may be configured to promote laminar flow.

The turbine may be an impulse turbine or a reaction turbine.

The moveable element may comprise one or moving parts. One or more parts of the moveable element may be movable in relation to one another.

The moveable element may consist of a single structure, all parts of which are in a fixed relationship to one another.

The turbine may comprise a rotor. The moveable element may take the form of a rotor.

The rotor may be of any suitable type or configuration.

The turbine may be lift based, for example comprising a hydrofoil or aerofoil type rotor or the like.

The rotor may comprise one or more rotor blades.

The rotor may comprise one or more rotor blades inclined relative to the axis of rotation of the rotor. For example, one or more rotor blades may extend both axially and circumferentially relative to the axis of rotation of the rotor. For example, one or more rotor blades may be helically arranged around the axis of rotation of the rotor. The rotor may comprise one or more rotor blades having faces inclined at an angle to the rotation axis.

The rotor blades may extend inwardly or outwardly from a circumferential structure (e.g. a ring or cylindrical structure).

The rotor blades may be arranged helically around an axis about which the rotor rotates. The rotor blades may extend between concentric circumferential structures.

In a reaction turbine, the rotor may comprise one or more nozzles. The flow pathway may extend through the rotor and out of the one or more nozzles.

The turbine may comprise a stator. The stator may be disposed around or against the fluid channel. The stator may extend around/against at least a part of a circumference of the turbine.

The turbine may comprise an electrical rotor and stator. The stator may comprise a permanent magnet or a conductive coil. The rotor may comprise the other of a permanent magnet or a conductive coil. Thus, rotation of the rotor may induce an electromotive force.

The rotor or stator may comprise more than one (e.g. an array of) magnets or conductive coils, as the case may be; for example, circumferentially distributed around the said rotor/stator.

The stator may extend around and/or against the moveable element. For example, in embodiments comprising a reaction turbine, the stator may comprise a series of fixed blades disposed around and/or adjacent to the rotor, to divert fluid expelled from the rotor. For example, a portion of a stator (e.g. an array of electrical coils) may be positioned to either side of a portion of a rotor (e.g. a part of the rotor comprising magnets).

The turbine may comprise a bearing or bushing. The bearing or bushing may constrain the motion of the moveable element. The bearing or bushing may reduce friction of the motion of the moveable element.

The turbine may comprise any suitable type of bearing or bushing, including (but not limited to); opposed low-friction surfaces (e.g. polished/machined metallic surfaces, or one or more surfaces comprising a low-friction coating, such as a plastics coating (e.g. PTFE) or a ceramic coating (e.g. a titanium nitride coating) or the like); a roller bearing (e.g. comprising rotatable needle or ball bearing elements); a fluid bearing (e.g. formed from a cushion of fluid between moving parts, e.g. fluid diverted from the flow pathway or fluid channel); a magnetic bearing.

For example, the turbine (e.g. the stator thereof) may comprise a magnetic bearing formed from an array of magnets disposed around a rotor which itself comprises one or more magnets. The magnetic bearing may be passive, in that the adjacent monopoles of the magnets in the rotor and stator may be alike, such that repulsive forces therebetween support the rotor. The magnetic bearing may comprise electromagnets, operable to alternate polarity as the rotor rotates, so as to maintain opposed polarity to magnets mounted on the rotor as they pass.

The turbine may comprise a circumferential recess. The bearing/bushing may be located within the circumferential recess. At least a part of the moveable element (e.g. rotor) may be located within the circumferential recess. For example, axial motion of the rotor may be constrained by the circumferential recess, and rotational motion supported by the bearing/bushing.

The stator may comprise, or be disposed to one or both sides of the circumferential recess.

The turbine may be configured to operate bidirectionally.

The turbine may be configured to permit fluid to flow along the flow pathway in either direction, depending on the direction of fluid flow along the channel. The turbine may be configured to extract energy from fluid flowing in either direction along the flow pathway or fluid channel. This may enable energy to be extracted by the turbine during both the injection and producing phases of a well, for example.

The moveable element may move in one sense under the action of fluid flowing along the flow pathway in a first direction (e.g. from an inlet to an outlet), and in an opposite sense under the action of fluid flowing along the flow pathway in an opposite second direction. For example, a said rotor may rotate clockwise (or anti clockwise) in relation to the direction of flow along the flow pathway—and thus the sense of the rotation may change when the direction of flow changes.

Alternatively, the movable element may move in the same sense regardless of the direction of flow along the flow pathway. For example, a said rotor may rotate in the same direction under the action of along the flow pathway in a first direction and in an opposite second direction.

Where the flow pathway is separated from the fluid channel along at least a part of its length, the turbine may be configured to selectively receive fluid into the flow pathway.

The flow pathway (for example, each said inlet and/or outlet) may be provided with a flow control arrangement.

The flow control arrangement may be configured to vary the rate of fluid flow along the flow pathway. The flow control arrangement may be configured to vary the proportion of fluid flowing from the fluid channel and along the flow pathway.

The flow control arrangement may enable regulation of the timing and/or rate of fluid flow along the flow pathway (and thus control over when and/or how much power is generated/extracted by the turbine).

Accordingly, the output of the turbine may be varied according to operational requirements, for example so that energy is only extracted from the fluid flowing along the fluid channel (which might lead to a reduction in overall flow) when required.

The flow control arrangement may be operable to close or restrict fluid from the fluid channel flowing along the flow pathway.

For example, the flow control arrangement may serve to protect the turbine from damage (e.g. physical damage to the rotor or overcharging of a battery or accumulator). Restriction or cessation of flow may also be desirable for example to prevent damage to the turbine from debris or harmful fluids flowing along the fluid channel, such as might be injected into a well. Restriction or cessation of flow may also be required to facilitate access to or maintenance of the turbine.

The flow control arrangement may be responsive to variations in flow or fluid conditions, e.g. variations in pressure/flow rate of fluid at the inlet/outlet, variations in composition or phase, and/or variations in the direction of flow.

The flow control arrangement operable to open only above a threshold pressure. For example, the turbine may be configured only to function when there is a sufficiently high pressure/flow rate within the fluid channel.

The turbine may comprise an autonomous flow control arrangement. The turbine may comprise an actuable flow control arrangement.

The flow control arrangement may comprise a valve arrangement. The valve arrangement may be configured to restrict or prevent fluid flowing along the flow pathway, when fluid in the fluid channel exceeds a predetermined pressure (or other fluid property, such as temperature, viscosity, phase or composition). The valve arrangement may be a one-way valve arrangement, configured to permit a greater fluid flow in one direction along the flow pathway and a smaller (or no) fluid flow in the other direction.

The valve arrangement may comprise a valve member. The valve member may be resiliently biased. The valve arrangement may comprise any suitable type of configuration of valve or valve member, such as a non-return valve, a flapper valve a poppet valve or the like.

An outlet (and/or inlet) may for example comprise a flapper valve, which may prevent fluid from flowing into the fluid channel against the flapper valve (e.g. from the outlet to the inlet). A flapper valve may also be urged closed if the pressure or flow in the fluid channel exceeds a predetermined threshold, so as to choke or stop fluid flow along the flow pathway.

The flow control arrangement may be adapted to separate a liquid from a gas. For example, the turbine may be adapted for use with a flow of a gas along the flow pathway and the inlet and/or outlet may be provided with a liquid/gas separator (such as a mesh mist eliminator or the like). Alternatively, the inlet/outlet, or a portion of the flow pathway, may be provided with a membrane by which gas may be separated from liquid in the flow pathway.

A flow control arrangement, and in particular an autonomous flow control arrangement, may comprise a material which changes its shape or configuration responsive to changes in fluid conditions.

For example, a flow control arrangement may comprise a swellable material, or a biasing member formed from or comprising a swellable material which swells on contact with oil or water so as to choke or block the flow pathway (e.g. an inlet and/or outlet). The swellable material may return to its original shape/configuration when contact with said oil/water ceases.

A flow control arrangement may comprise a shape-memory material (such as an alloy or plastics shape-memory material), or a biasing member formed from or comprising a shape-memory material, which changes its shape/configuration with temperature.

A valve member may be operatively coupled to biasing member which changes its shape or configuration responsive to changes in fluid conditions, and may be movable responsive to changes in the shape/configuration of the biasing member.

An actuable flow control arrangement may be actuated responsive to control signals (for example issued to a turbine in a well, from the surface), or may be self-controlling, responsive to variations in flow or fluid conditions.

An actuable flow control arrangement may comprise an electronic, electromechanical, pneumatic and/or hydraulic actuation arrangement.

For example, the flow control arrangement may be comprise an actuable valve operable responsive to a control signal.

The turbine may comprise a control unit, and a power source such as a battery, operable to actuate the flow control arrangement. The control unit may comprise a processor, operable to receive and respond to a control signal. The control unit may be operable to cause the flow control arrangement to toggle between configurations (for example between open and closed configurations).

One or more further aspects of the operation of the turbine may be controlled or regulated by a control unit. The turbine may comprise a control unit with operable to regulate the extraction, storage and/or delivery of energy, for example.

A control signal may comprise a sensor reading (such as a reading from a flow rate sensor, a pressure sensor a temperature sensor or a conductivity sensor or the like).

The turbine may comprise required the sensor apparatus, or may be configured to be coupled to sensor apparatus already present in the vicinity of the turbine. As mentioned below, the turbine may be configured to function as a sensor.

The flow control arrangement may be configured to respond automatically according to signals received from one or more sensors, indicative of predetermined changes in fluid conditions such as temperature, pressure, flow rate, composition, etc.

Alternatively, or in addition, the flow control arrangement may be operable responsive to a selectively applied control signal. A control signal may for example be an electrical signal, conveyed by a wire (e.g. a wireline or a control cable), or may be a wireless signal (e.g. an acoustic signal, an electromagnetic signal such as a radio or microwave signal, or a signal conveyed by pressure waves) or an optical signal, conveyed by an optical fibre.

Accordingly, the turbine may comprise or be connectable to signal receiving apparatus (such as a said sensor), or may be configured to be coupled to sensor apparatus already present in the vicinity of the turbine.

Other suitable flow control arrangements are known to those skilled in the art.

The turbine may comprise more than one flow control arrangement. For example a flow control arrangement may be associated with the or each inlet and/or the or each outlet.

The turbine may comprise more than one type of flow control arrangement.

In some embodiments, the turbine may be configured to function as a sensor. A sensor output from the turbine may for example correlate to a flow rate of fluid along the flow pathway (and thus typically also the fluid channel). An output from the turbine, for example variations or oscillations, may be indicative of a fault condition such as an imbalance in the rotor caused by debris or breakage.

The sensor output may comprise a power output from the turbine (e.g. the electromotive force induced between the rotor and stator). The turbine may comprise one or more Hall effect sensors. An output of a said Hall effect sensor, or the relative output of respective Hall effect sensors, may be indicative of a position of the moveable element.

For example, a Hall effect sensor signal may be obtained from the stator. Where a stator comprises portions to each side of a rotor (e.g. to each side of a circumferential channel) Hall effect sensor signals may be obtained from each of the portions of a stator. Accordingly, the Hall effect sensor signal or signals may be indicative of the axial position of the rotor in relation to the stator, which may in turn correlate to the force applied to the rotor by fluid flow, and so to the fluid's flow rate, density, viscosity and the like.

The invention thus extends in a further aspect to the use of a turbine as disclosed herein as a sensor, to measure one or more fluid properties, or changes thereof.

Differences between expected and detected sensor readings from the turbine and/or any sensors associated therewith, may be used to diagnose a fault with the turbine, such as a blockage in the flow pathway or an imbalance or other malfunction of the movable element.

An aspect or embodiment relates to apparatus for use in a fluid flow system (for example downhole apparatus) comprising;
 a body defining a fluid channel; and
 a turbine coupled to the body and defining a portion of the fluid channel, the turbine comprising;
  a flow pathway in communication with the fluid channel; and
  a moveable element disposed around the fluid channel, in the flow pathway;
  the moveable element moveable under the action of fluid flowing along the flow pathway so as to extract energy therefrom.

The fluid channel, and/or or the portion defined by the turbine, may be tubular. The body may be generally tubular.

The body may be a fluid conduit or a tubular. The body may comprise a mandrel.

The body may comprise a connector, e.g. for connecting a tubular to an adjacent tubular, or to two adjacent tubulars (to each end of the body). The turbine may for example form part of or define a pup joint or other coupling between tubulars.

The body may define the inlet(s) and/or the outlet(s) of the flow pathway.

One or more parts of the turbine may be formed integrally with the body.

The body (e.g. the walls of a conduit, tubular or mandrel) may define the fluid channel, or at least a portion of the fluid channel.

One or more parts of the turbine (or the entire turbine) may be recessed into the body. One or more parts of the turbine (or the entire turbine) may be recessed into a thickened wall portion of the body, such as a mandrel extending from or connectable to a tubular.

The turbine may be adapted to be secured to the body. For example, the turbine may form part of a collar, which may for example be secured around a tubular (for example by welding or by way of fixings such as bolts). The turbine may form part of a mandrel which may be secured to or around a tubular.

The turbine may form part of a sleeve, which may for example be introduced into the fluid channel (e.g. by running the sleeve into a tubular such as a well).

The turbine may be configured for use with an existing or a standard tubular, such as oilfield tubing. The turbine may be adapted to be retrofitted to and existing fluid flow system, for example by replacement of a length of tubular, or by coupling a collar or mandrel comprising the turbine, to a tubular.

A tubular such as coiled tubing may for example be machined to form aperture through the walls of the tubular to the fluid channel, to be aligned with corresponding inlet/outlet(s) of the flow pathway.

The turbine or apparatus may comprise or be configured for connection to additional components, such as one or more inflow control devices, sensors, logging tools etc., or other powered downhole apparatus as known in the art.

In use in downhole applications, such as when the turbine or apparatus forms part of a work string, or other applications in which It may be convenient for the "drift" (i.e. the maximum radius or diameter that equipment extends from an axis along a tubular) of the turbine or apparatus to be the same as or less than other components to which it is connected. For example, apparatus to be run into a well is required to fit within the constraints of lubricator valves and the like and so the turbine/apparatus may advantageously have a diameter which enables it to be accommodated and run into a well.

Energy may be supplied to one or more additional components from an energy storage arrangement. Energy may be supplied to one or more additional components by the turbine. Energy may be supplied when the turbine is rotating, or at a later time.

Energy extracted or generated by the turbine may be utilised for example to operate downhole sensors, or downhole apparatus such as inflow control devices and the like.

The apparatus may comprise more than one turbine. More than one turbine may be spaced apart axially on the body.

A turbine may comprise more than one movable element, e.g. more than one rotor. A turbine may comprise more than one stator. For example, more than one rotor may be positioned in a flow pathway, to extract a greater proportion of energy therefrom.

In embodiments comprising more than one rotor (e.g. of adjacent turbines), adjacent rotors may be contra-rotating.

The apparatus may be, or form part of, a downhole tool (e.g. a logging tool), a completion string, or a connector for connecting a length of tubular to another length of tubular.

Accordingly, the invention extends in a further aspect to a downhole tool having a fluid channel (e.g. a throughbore) extending therethrough, and comprising a turbine or downhole apparatus according to other aspects.

In yet another aspect of the invention, there is provided a completion string having a fluid channel (e.g. a throughbore) extending along the completion string, and comprising a turbine or downhole apparatus according to other aspects. The invention also extends in another aspect to a connector for connecting a length of a tubular to another length of tubular (for example a pup joint), having a fluid channel (e.g. a throughbore) extending through the connector, and comprising a turbine or downhole apparatus according to other aspects. Also in accordance with an aspect of the invention is a mandrel for connection to or around a tubular, the mandrel comprising a turbine or apparatus according to other aspects.

An aspect or embodiment relates to a method for extracting energy from fluid flowing along a fluid channel, comprising;
providing a turbine which defines a portion of the fluid channel, and which comprises a flow pathway in communication with the fluid channel;
passing fluid from the fluid channel along the flow pathway; and
moving a moveable element which is disposed around the fluid channel, in the flow pathway, under the action of the fluid flowing along the flow pathway so as to extract energy therefrom.

The flow pathway may be separated from the fluid channel, along at least a part of its length. Accordingly, the method may comprise passing fluid from the fluid channel into the flow pathway (e.g. through one or more inlets), along the flow pathway and back into the fluid channel (e.g. through one or more outlets).

The method may comprise rotating a rotor disposed in the flow pathway around the fluid channel, under the action of the fluid flowing along the flow pathway.

The method may comprise varying the flow of fluid along the flow pathway. The method may comprise varying the proportion of fluid from the fluid channel which flows along the flow pathway.

The method may comprise operating a flow control arrangement. The method may comprise detecting fluid property or a change in a fluid property, such as the composition, temperature, pressure or flow rate of the fluid flowing through the fluid channel and consequently varying the flow of fluid along the flow pathway.

The method may comprise using the turbine to detect a fluid property or a change in a fluid property (e.g. based upon the output or variations in the output of the turbine, or based on Hall effect sensor readings from one or more Hall effect sensors associated with an electrical stator).

The method may comprise storing the extracted energy.

The method may comprise charging an electrical cell or battery with electrical energy generated by rotation of the rotor (e.g. by electromagnetic induction).

The method may comprise charging a fluid accumulator.

The method may comprise placing an elastic member in tension or compression, using energy transmitted from the rotor (e.g. via a drive arrangement).

The method may comprise operating a flow control arrangement (to restrict or prevent flow of fluid along the flow pathway) when the amount of stored energy exceeds a predetermined energy storage capacity.

The stored energy may be used to power other apparatus in the fluid system, such as a downhole tool, an inflow control device, a sensor, and the like. The method may comprise directly utilizing the energy extracted by the turbine.

An aspect or embodiment relates to a method for powering apparatus in a fluid system, comprising;
extracting energy from fluid flowing along a fluid channel in accordance with other aspects; and
powering apparatus in the fluid system using the extracted energy.

The method may comprise storing the extracted energy, and powering the apparatus using the stored energy.

The method may comprise stopping energy extraction and/or storage, when an energy storage arrangement is at maximum capacity (e.g. when a battery is fully charged). The method may comprise stopping fluid from flowing along the flow pathway (for example by operating a flow control arrangement).

Further preferred and optional features of each aspect of the invention correspond to preferred and optional features of other aspects of the invention.

BRIEF DESCRIPTION OF THE DRAWINGS

These and other aspects will now be described, by way of example only, with reference to accompanying drawings, in which.

DETAILED DESCRIPTION OF EXAMPLE EMBODIMENTS

Figure 1:
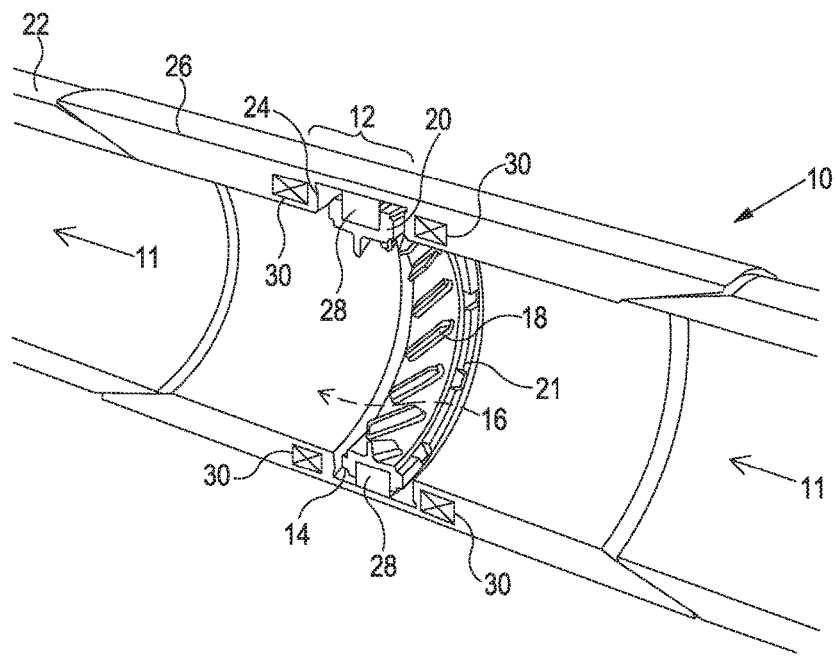
FIG. 1 is a cut-away view of a turbine.

FIG. 1 shows a turbine 10 in accordance with an embodiment of the invention. The turbine 10 is configured to extract energy from fluid flowing along a fluid channel 11. The turbine defines a portion 12 of the fluid channel. A moveable element, in the embodiment shown a rotor 14, is disposed around the fluid channel 11 (and in particular the portion 12 defined by the turbine). A flow pathway 16, forming part of the periphery of the fluid channel, extends through the rotor blades 18. Thus, the flow pathway is in communication with the fluid channel and the moveable element 14 is disposed in the flow pathway 16 around the fluid channel 11, 12.

The turbine 10 is provided within a portion of a tubular 22.

The moveable element 14 is moveable under the action of fluid flowing along the flow pathway 11, 12 so as to extract energy therefrom. For example, energy may be extracted from a flow of fluid produced from a subterranean formation and/or a flow of fluid injected into a work string, which may be a production or injection tubing string, or at the wellhead and associated pipework. Indeed the turbine may be used to extract energy from any flow of fluid along a fluid channel, and may be employed for example in water or hydrocarbon distribution pipelines, chemical production and refining and the like.

The rotor comprises a circumferential structure 20, and the rotor blades 18 extend inwardly from the circumferential structure 20. The rotor blades are arranged generally helically, so that they are at an angle in relation to fluid flowing along the fluid channel. Thus, when fluid passing along the flow pathway 16 impinges a rotor blade 18, a component of force is transmitted rotationally (anticlockwise in the embodiment shown). Should the flow of fluid be reversed, so too would the direction of rotation.

The rotor 14 is recessed within a circumferential channel 24 in the body 26 of the turbine, such that only the blades 18 extend into the flow pathway. Thus the turbine results in a minimal reduction in the flow area of the flow pathway.

The turbine 10 further comprises a bearing 28 between the rotor 14 and the base of the channel 24. In the embodiment shown, the bearing is a roller bearing, however other types of bearing, such as a fluid bearing a magnetic bearing, or a bushing, may be used. Accordingly, the channel 24 restricts axial motion of the rotor 14, and the bearing 28 facilitates low-friction rotational motion of the rotor.

Also mounted around each side of the circumferential structure 20 are permanent magnets 21.

Figure 2:
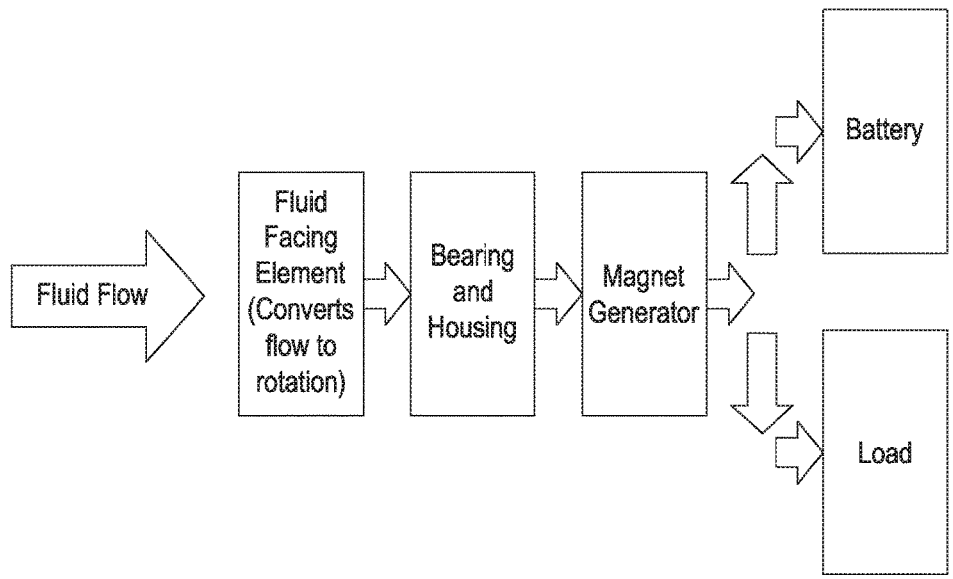
FIG. 2 shows a flow chart of the operation of the turbine of FIG. 1.

The turbine 10 includes a stator 30, in the form of an annular array of electrical coils within the body/housing 26 of the turbine, to either side of the rotor 16 and thus adjacent to the magnets 21. Accordingly, in use, movement of the movable element (rotation of the rotor 16) causes an electromotive force to be induced in the stator 30. i.e. Kinetic energy from the fluid flow is converted into electrical energy, which may be stored (for later use to power other components) and/or used directly to power other components (not shown)—as shown in the flow chart of FIG. 2.

Figure 3:
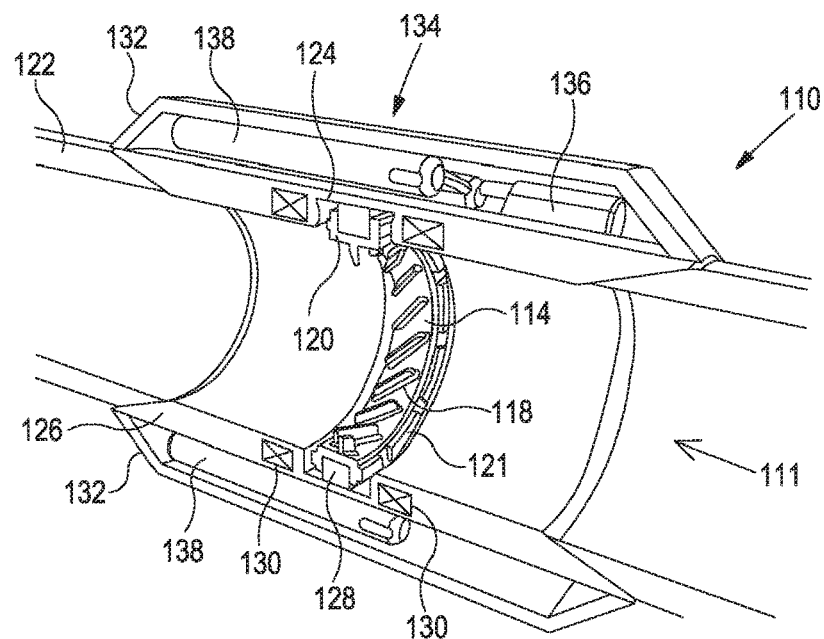
FIG. 3 shows a cut-view of another embodiment of a turbine, comprising an energy storage arrangement.

FIG. 3 shows an alternative embodiment of a turbine 110 in accordance with the invention. Features in common with turbine 10 are provided with like reference numerals, incremented by 100.

The turbine 110 comprises a mandrel 132, in which is housed an energy storage arrangement 134. The energy storage arrangement 134 comprises an electric pump 136 operable to charge fluid accumulators 138 with a pressurized fluid. The pressurized fluid may be fluid diverted from the fluid channel, or fluid diverted from outside of the mandrel (e.g. a wellbore fluid), via fluid conduits (not shown).

The pressurized fluid may be stored and released at a later time, to power pneumatic or, more typically, hydraulic apparatus connected to the energy storage arrangement. The turbine may also be configured to charge and release pressurized fluid at the same time. For example, the pump may be operable to charge some of the accumulators 138, whilst one or more other accumulators are being discharged.

In alternative embodiments (not shown) the energy storage arrangement may comprise an electrical cell or battery, which may be charged by current induced in the stator.

Figure 4:
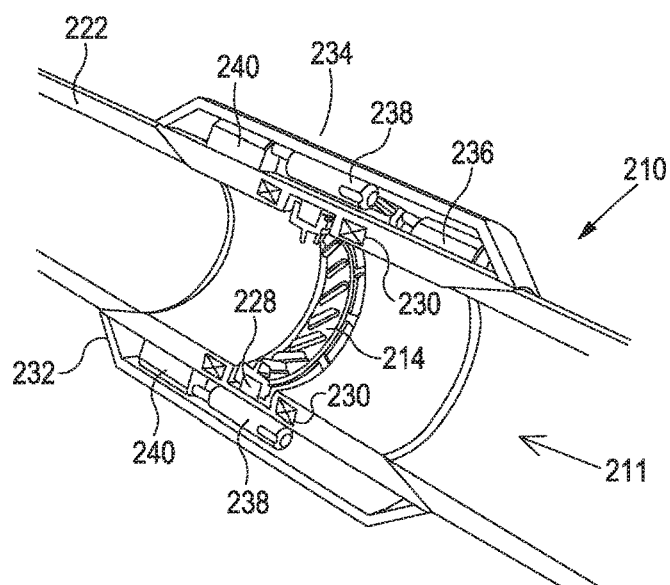
FIG. 4 shows a cut-view of another embodiment of a turbine, comprising an energy storage arrangement and an energy generator.

FIG. 4 shows another embodiment of a turbine 210 in accordance with the invention. Features in common with turbine 10 are provided with like reference numerals, incremented by 200. Features in common with turbine 110 are provided with like reference numerals, incremented by 100.

The turbine 210 includes an energy storage arrangement 234 in which the accumulators 238 are coupled to electric generators 240.

The turbine 210 is used to extract and store energy in the accumulators 238 in the form of fluid pressure potential energy, in the same way as turbine 110. Pressurized fluid may be released from the accumulators 238 so as to pass through the electric generators 240. Electrical energy generated by the generators 240 may be used to power associated downhole equipment (not shown), as illustrated in the flow chart of FIG. 5. This means for storing energy to be used as electrical energy may be employed as an alternative to storing electrical energy in a battery in use of the turbine in certain conditions; for example in high temperature conditions as might be encountered in a wellbore, in which conventional electrical batteries may lose performance or may not function at all.

The turbine 210 may also be configured to enable hydraulic or pneumatic apparatus directly from pressurized fluid discharged from one or more of the accumulators 238.

Figure 5:
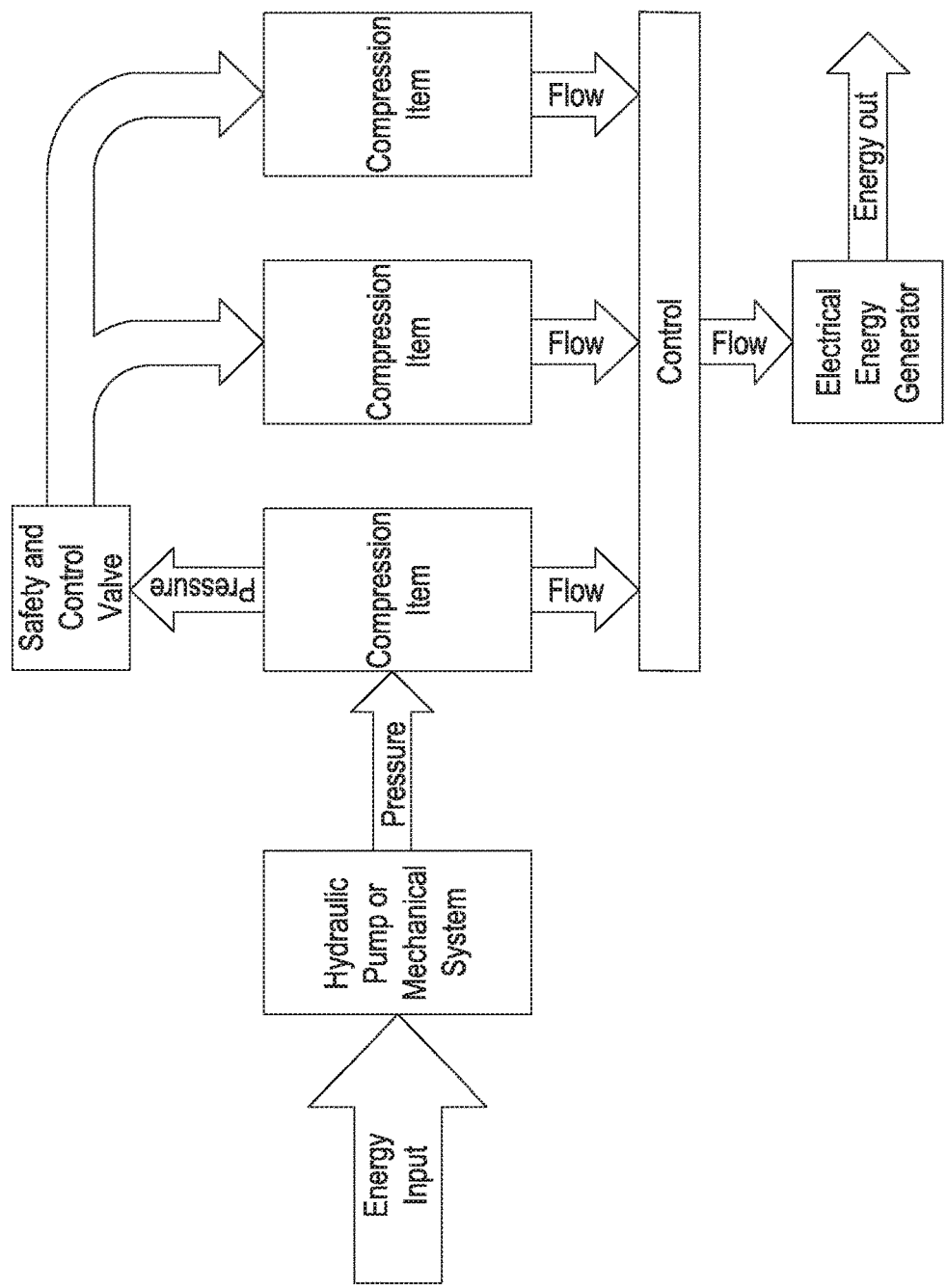
FIG. 5 shows a flow chart of the operation of the turbines of FIGS. 3 and 4.

It will appreciated that ancillary apparatus such as pressure control valves, safety valves and the like, which associated with the energy storage arrangements 134, 234 and are mentioned in FIG. 5 have been omitted for clarity from FIGS. 3 and 4. The turbines 10, 110 and 210 may also further comprise a control unit (not shown) with such processing capability as required to regulate the extraction, storage and/or delivery of energy.

Figure 6:
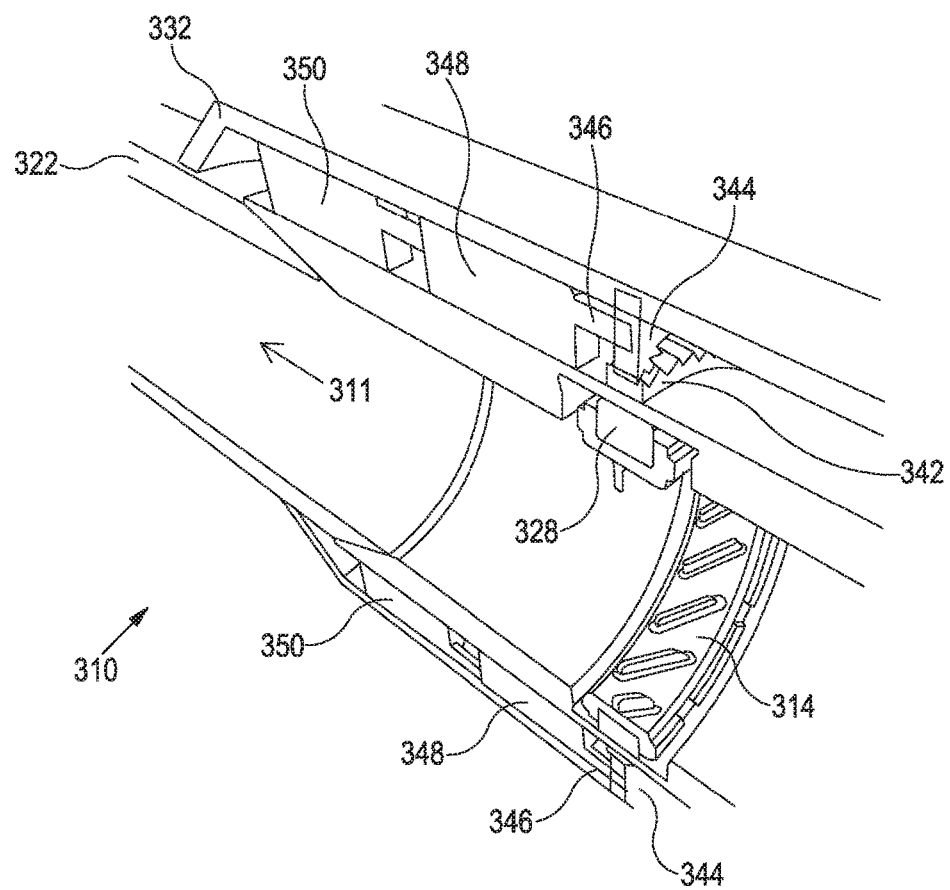
FIG. 6 shows a cut-view of another embodiment of a turbine, comprising a mechanical energy storage arrangement.

FIG. 6 shows another embodiment of a turbine 310 in accordance with the invention. Features in common with turbine 10 are provided with like reference numerals, incremented by 300. Features in common with turbine 110 are provided with like reference numerals, incremented by 200. Features in common with turbine 210 are provided with like reference numerals, incremented by 100.

In contrast to turbines 10, 110 and 210 described above, the turbine lacks an electrical stator, and the rotor 314 of the turbine 310 lacks any permanent magnets.

Instead, energy is transmitted from the rotor 314 via a drive arrangement. The drive arrangement includes an annular rack 342 which is mounted to the rotor 314 and which extends into the mandrel 332 and couples to pinion wheels 344, each of which is mounted to a drive shaft 346. Each drive shaft powers a mechanical accumulator 348, capable of storing mechanical potential energy, e.g. by winding a coil spring or otherwise placing an elastic member into tension or compression.

The stored mechanical energy may be utilized directly, or (as shown in the figure) the apparatus may be configured for the stored mechanical energy to be released and used to generate electrical energy by powering electrical generators 350 connected in series with the accumulators 348.

Figure 7:
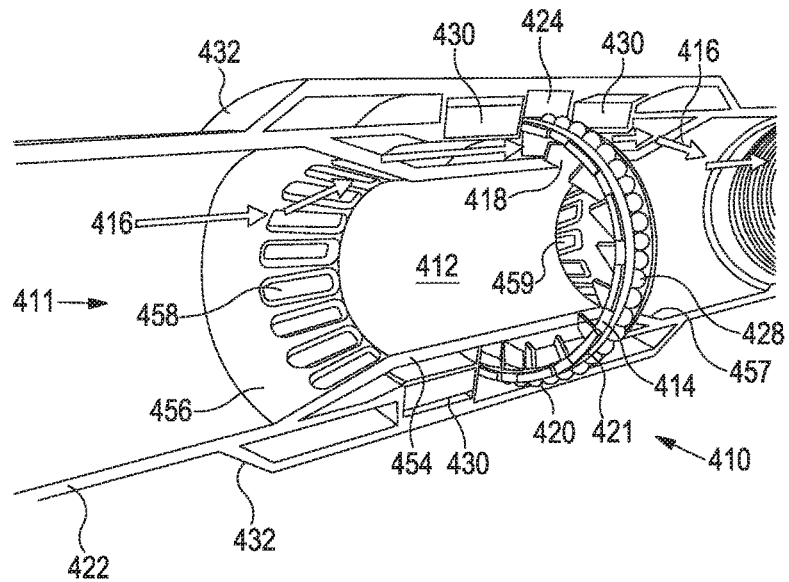
FIG. 7 shows a cut-view of another embodiment of a turbine, comprising a flow path which is separate from the fluid channel.

FIG. 7 shows a still further embodiment of a turbine 410 in accordance with the invention. Features in common with the embodiments described above are provided with like reference numerals, incremented by a further 100. Features associated with energy storage and delivery are omitted for clarity.

The turbine 410 defines a reduced diameter portion 412 of the fluid channel 411. The stator 430, the channel 424, the outer circumferential structure 420 and the bearing 428 are recessed into the mandrel 432, so as to minimize the flow area reduction of the portion 412 of the fluid pathway, in comparison to the adjacent parts of the fluid pathway 411.

The turbine 410 includes a flow pathway 416 which is separated from the fluid pathway 411, 412, by an internal body portion 454 of the turbine. The leading and trailing faces 456, 457 of the body portion 454 are generally frustoconical, and are provided with a series of inlets 458 to the flow pathway 416, and outlets 459 from the flow pathway.

In use, a portion of fluid flowing along the fluid channel is captured and channeled through the inlets. This fluid flows along the flow pathway and is returned to the fluid channel (downstream of the portion 412 defined by the turbine 410) through the outlets.

In alternative embodiments (not shown), the rotor may be supported around, rather than within a bearing (i.e. by the internal body portion) and the rotor may comprise blades which extend outwardly from a circumferential structure, or which extend between inner and outer circumferential structures (through which the flow pathway extends).

The turbine 410 may optionally be provided with a flow control arrangement to control the flow of fluid into the flow pathway 416 through the inlets (and alternatively or additionally out through the outlets). A flow control arrangement may for example be operated using a control unit, and responsive to sensor signals indicative of a change in fluid conditions.

Figure 8:
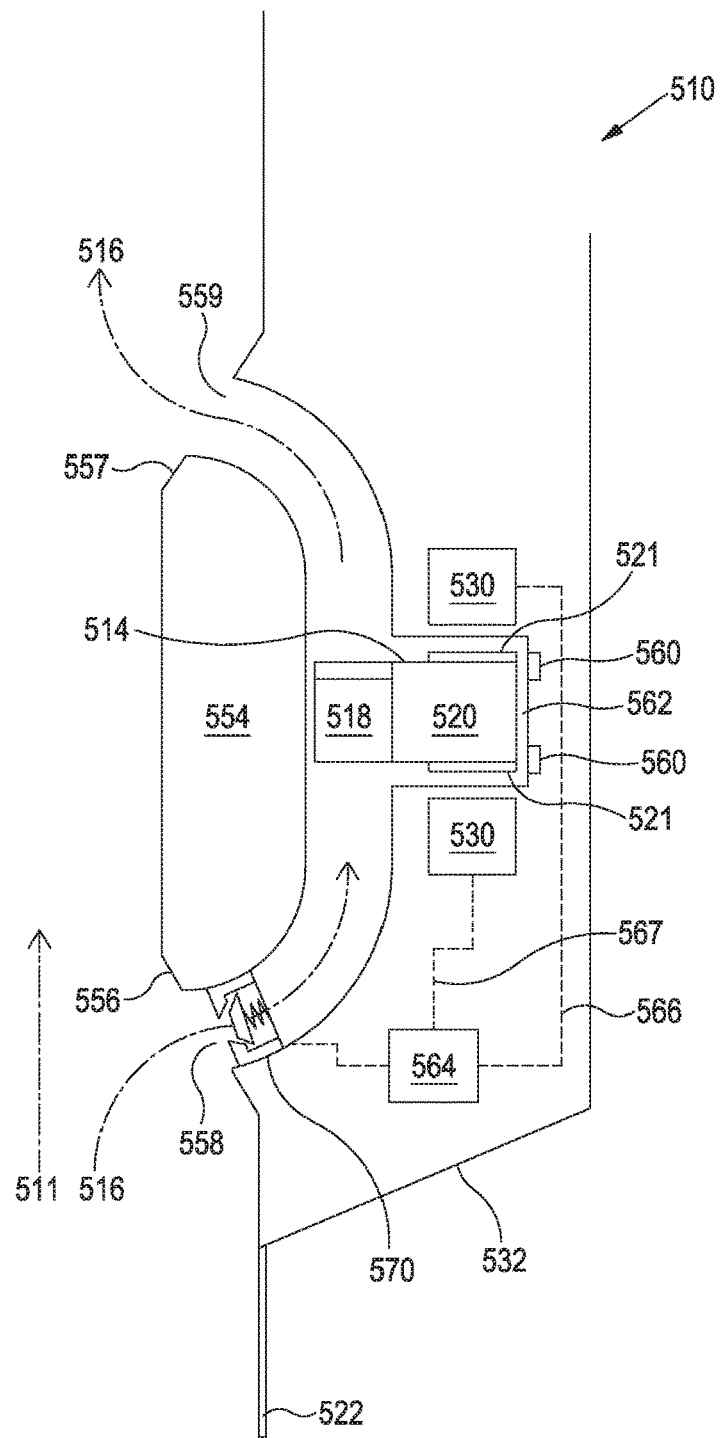
FIG. 8 shows a schematic cross sectional view of another embodiment of a turbine, comprising a Hall sensor and an inflow control arrangement.

FIG. 8 shows a detail view of a part of a still further embodiment of a turbine 510 in accordance with the invention, with features in common with the turbine 410 the same reference numerals, incremented by 100.

The turbine 510 functions generally as described above, in that an electromotive force is induced in the stators 530, by the magnets 521 (mounted on the rotor 514), when the rotor is urged to rotate under the action of fluid flowing along the flow pathway 516. The turbine is also provided with an annular array of electro magnets 560, mounted in the body 526 of the turbine 510 adjacent to the magnets 521 of the rotor. The electromagnets 560 are operable to alternate polarity as the rotor rotates, so as to maintain opposed polarity to magnets mounted on the rotor as they pass, and thereby provide a magnetic bearing 562 between the rotor and the housing. A magnetic bearing may be less prone to wear or damage than a mechanical bearing or bushing.

For clarity, details concerning connections between the power supply for the magnetic bearings (which may be charged from power generated by the turbine) is omitted.

The turbine 510 further includes a Hall sensor control unit 564. In use, Hall sensor signals are received from the stators 530 along electrical connections 566 and 567.

The values of and the differences in values between the sensor readings from each of the stators corresponds to the relative distance between the rotor 514 and each of the stators, which in turn may correlate to the forces applied along the rotation axis of the rotor by fluid flowing in the fluid pathway. These readings may also correlate to changes in fluid conditions, such as overall flow rate along the fluid channel, viscosity, temperature, etc. Indeed, patterns of Hall sensor readings from the various electrical coils which form the stators 530 may provide additional information about the stability of the rotor's rotation. Instability may be cause for example by debris, damage or a loss of power to the magnetic bearing.

The turbine 510 also includes a flow control arrangement 570 at the inlet 558 of the flow pathway 516. The flow control arrangement in the embodiment shown is a solenoid valve, but alternate active and passive arrangements will be known to those skilled in the art. The solenoid valve 570 is connected to the Hall sensor control unit 564, which is operable to regulate flow of fluid into the flow pathway by controlling the opening and closing of the valve 570. For example, if the Hall sensor control unit determines that fluid flow is excessive, the valve 570 may be closed to protect the turbine from damage.

Figure 9:
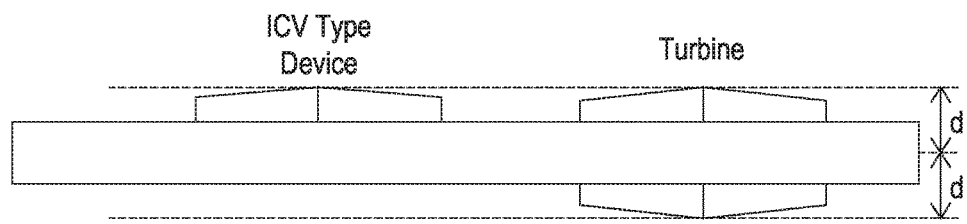
FIG. 9 shows a schematic side view of a turbine and an inflow control device on a work string.

The turbine mandrel may be sized to fall within the drift d of other apparatus, for example on a workstring, as shown in FIG. 9.

While certain embodiments have been described, these embodiments have been presented by way of example only. Indeed the novel apparatus and methods described herein may be embodied in a variety of other forms; and various omissions, substitutions and changes may be made without departing from the spirit of the invention.

The invention claimed is:

1. A turbine configured to be formed integrally with a tubular, for extracting energy from fluid flowing along a fluid channel, the turbine comprising;
   a flow pathway in communication with the fluid channel, such that fluid from the fluid channel may flow to and from the flow pathway, the flow pathway extending in an annulus around the fluid channel, and separated from the fluid channel by an internal body portion, the internal body portion having a reduced diameter section having a frustoconical upstream face and a frustoconical downstream face, the frustoconical upstream face being provided with a plurality of angled inlets to the flow pathway and the frustoconical downstream face being provided with a plurality of angled outlets from the flow pathway; and
   a moveable element disposed around the fluid channel, in the flow pathway;
   the moveable element moveable under action of fluid flowing along the flow pathway so as to extract energy therefrom,
   wherein fluid from the fluid channel passes through the plurality of angled inlets into the flow pathway, along the flow pathway, and exits the flow pathway through the plurality of angled outlets, back into the fluid channel.

2. The turbine according to claim 1, wherein the moveable element comprises a rotor.

3. The turbine according to claim 2, wherein the rotor comprises one or more rotor blades.

4. The turbine according to claim 3, wherein the rotor blades are helically arranged around an axis of rotation of the rotor.

5. The turbine according to claim 3, wherein the rotor blades extend from a circumferential structure.

6. The turbine according to claim 1, comprising a stator disposed around or against the fluid channel.

7. The turbine according to claim 1, comprising a circumferential recess, wherein at least a part of the moveable element is located within the circumferential recess.

8. The turbine according to claim 1, wherein the turbine is configured to selectively receive fluid into the flow pathway.

9. The turbine according to claim 8, wherein the flow pathway is provided with a flow control arrangement.

10. The turbine according to claim 9, wherein the flow control arrangement is responsive to variations in flow or fluid conditions including at least one of variations in pressure/flow rate, variations in composition or phase, and variations in direction of fluid flow.

11. The turbine according to claim 9, comprising a control unit operable to actuate the flow control arrangement.

12. The turbine according to claim 11, wherein the control unit comprises a processor operable to receive and respond to a control signal.

13. The turbine according to claim 1, configured to function as a sensor.

14. An apparatus for use in a fluid flow system, the apparatus comprising;
 a body defining a fluid channel; and
 a turbine according to claim 1 coupled to the body and defining a portion of the fluid channel.

15. The apparatus according to claim 14, wherein the turbine is adapted to be secured to the body.

16. The apparatus according to claim 15, wherein the turbine forms part of a mandrel, adapted to be secured around the tubular.

17. A method for extracting energy from fluid flowing along a fluid channel, comprising;
 providing a turbine, the turbine configured to be formed integrally with a tubular, and which comprises a flow pathway in communication with the fluid channel, such that fluid from the fluid channel may flow to and from the flow pathway, the flow pathway extending in an annulus around the fluid channel and being separated from the fluid channel by an internal body portion, the internal body portion having a reduced diameter section having a frustoconical upstream face and a frustoconical downstream face, the frustoconical upstream face being provided with a plurality of angled inlets to the flow pathway and the frustoconical downstream face being provided with a plurality of angled outlets from the flow pathway;
 passing fluid from the fluid channel along the flow pathway; and
 moving a moveable element which is disposed around the fluid channel, in the flow pathway, under an action of the fluid flowing along the flow pathway so as to extract energy therefrom,
 wherein fluid from the fluid channel passes through the plurality of angled inlets into the flow pathway, along the flow pathway, and exits the flow pathway through the plurality of angled outlets, back into the fluid channel.

18. The method according to claim 17, wherein the moveable element comprises a rotor and the method further comprises rotating the rotor disposed in the flow pathway around the fluid channel, under the action of the fluid flowing along the flow pathway.

19. The method according to claim 17, comprising operating a flow control arrangement so as to vary the flow of fluid along the flow pathway.

20. The method according to claim 17, comprising using the turbine to detect a fluid property or a change in a fluid property.

* * * * *